United States Patent [19]
Li et al.

[11] Patent Number: 5,260,043
[45] Date of Patent: * Nov. 9, 1993

[54] CATALYTIC REDUCTION OF NOX AND CARBON MONOXIDE USING METHANE IN THE PRESENCE OF OXYGEN

[75] Inventors: Yuejin Li, Wescosville; John N. Armor, Orefield, both of Pa.

[73] Assignee: Air Products and Chemicals, Inc., Allentown, Pa.

[ * ] Notice: The portion of the term of this patent subsequent to Sep. 22, 2009 has been disclaimed.

[21] Appl. No.: 929,619

[22] Filed: Aug. 13, 1992

Related U.S. Application Data

[63] Continuation-in-part of Ser. No. 739,273, Aug. 1, 1991, Pat. No. 5,149,512.

[51] Int. Cl.$^5$ .................... B01J 8/00; C01B 21/00; C01B 31/18; B01D 47/00
[52] U.S. Cl. .................... 423/239.2; 423/212; 423/246; 423/351
[58] Field of Search ............... 423/239, 239 A, 239 Z, 423/246, 212, 351

[56] References Cited

U.S. PATENT DOCUMENTS

| | | | |
|---|---|---|---|
| 3,476,508 | 11/1969 | Kearby et al. | 23/2 |
| 4,973,399 | 11/1990 | Green et al. | 454/475 |
| 4,999,173 | 3/1991 | Kamiyama et al. | 423/239 |
| 5,017,538 | 5/1991 | Takeshima | 502/64 |
| 5,041,272 | 8/1991 | Tamura et al. | 423/239 |
| 5,078,981 | 1/1992 | Kagawa et al. | 423/239 |
| 5,110,777 | 5/1992 | Kamiyama et al. | 502/68 |
| 5,149,512 | 9/1992 | Li et al. | 423/239 |

FOREIGN PATENT DOCUMENTS 2-291258  5/1989  Japan .

OTHER PUBLICATIONS

Iwamoto and coworkers, Shokubai 32, 6 430 Jan. 1990.
Iwamoto and coworkers, Catalysis Today 10 57 Sep. 1991.
Truex and coworkers, Platinum Metals Review, vol. 36, 1, Mar. 1992.
Japanese Laid-open Patent Application (Kokai) No. 4-244218 publication date Sep. 1992.
European Patent Application No. 91121618.2; filed: Dec. 17, 1991 Publication No. 0 491 359 A1 (Nakano, Masao) Publication date Jun. 1992.
European Patent Application No. 91121619.0; filed: Dec. 17, 1991 Publication No. 0 491 360 A1 (Nakano, Masao) publication date Jun. 1992.
Adlhart, et al., R. E. Chem. Eng. Pro. 76, 73 (Feb. 1971).
Ault and Ayen, R. J., AICHE J. 17, 265 (Mar. 1977).
Hamada and coworkers, Appl. Catal. 64, L1 Dec. 1990.
Catal. Lett. 6, 239 Oct. 1990.

*Primary Examiner*—Gregory A. Heller
*Attorney, Agent, or Firm*—Keith D. Gourley; James C. Simmons; William F. Marsh

[57] ABSTRACT

The invention describes a process for catalytically destroying NOx and carbon monoxide present in oxygen-containing combustion products wherein methane serves as a reductant. The process comprises combusting a fuel source in the presence of oxygen to form combustion products comprising nitrogen oxides, carbon monoxide and oxygen; introducing methane into the combustion products in an amount such that the total amount of methane to nitrogen oxides present, expressed as a ratio, by volume is greater than about 0.1; and reacting the nitrogen oxides, carbon monoxide, methane and oxygen in the presence of an exchanged crystalline zeolite under conditions sufficient to convert the nitrogen oxides and carbon monoxide to gaseous nitrogen, water and carbon oxides. Suitable catalysts include zeolites having a silicon to aluminum ratio of greater than or equal to about 2.5 which zeolites are exchanged with a cation selected from the group consisting of gallium, niobium, cobalt, nickel, iron, chromium, rhodium and manganese.

19 Claims, 1 Drawing Sheet

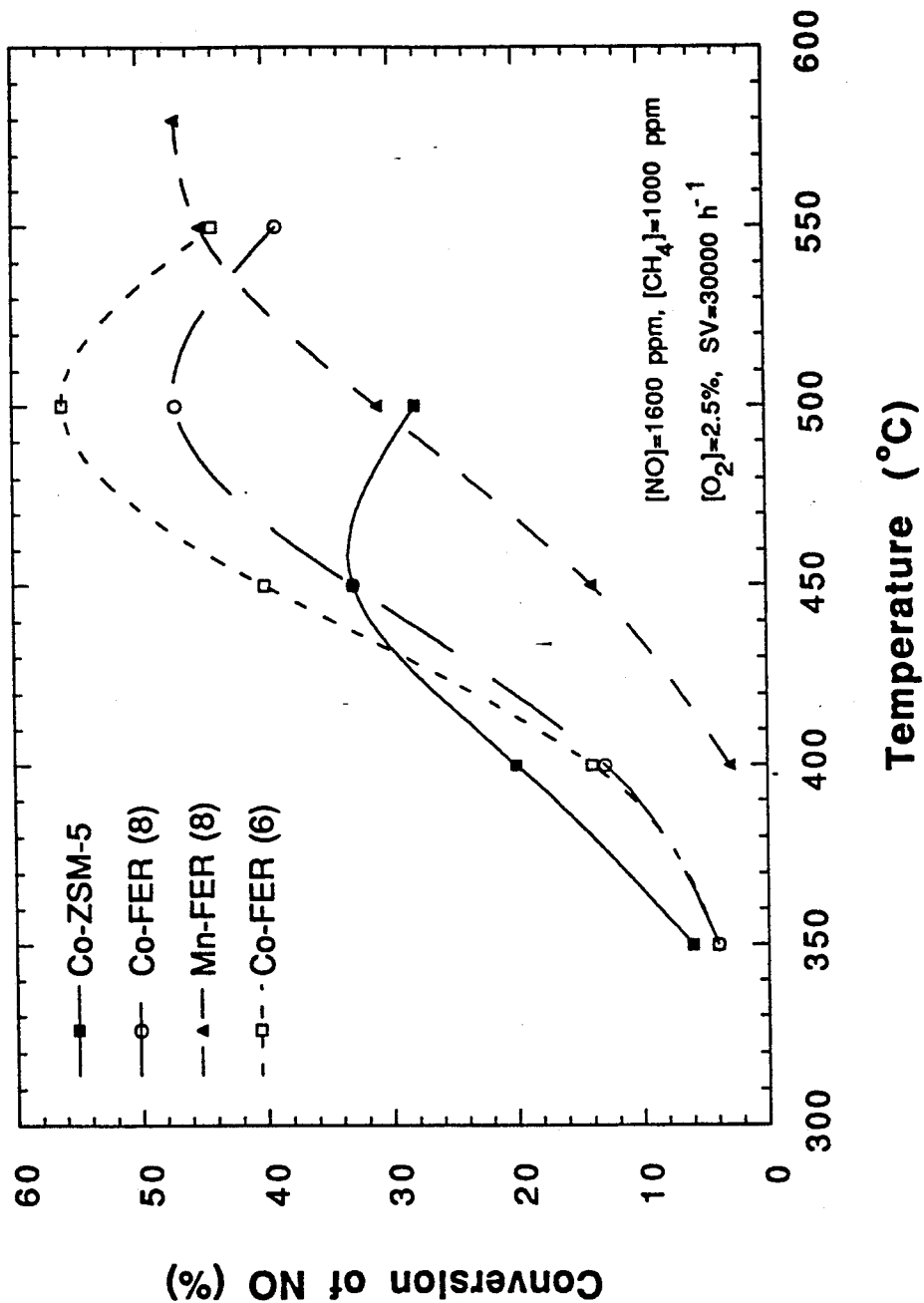

CATALYTIC REDUCTION OF NOX AND CARBON MONOXIDE USING METHANE IN THE PRESENCE OF OXYGEN

CROSS-REFERENCE TO RELATED APPLICATIONS

This application is a continuation-in-part to copending application Ser. No. 07/739,273, filed Aug. 1, 1991, now U.S. Pat. No. 5,149,152, the specification and claims which are incorporated by reference and made a part of this application.

TECHNICAL FIELD OF THE INVENTION

The present invention describes a process for conveniently destroying NOx and carbon monoxide which may be present in combustion products, such as flue gases and engine exhaust, wherein such components are catalytically converted in the presence of methane and oxygen to the corresponding reduction products of nitrogen gas, carbon dioxide and water. The process utilizes metal-exchanged crystalline zeolite catalysts having a silicon to aluminum ratio of greater than or equal to about 2.5.

BACKGROUND OF THE INVENTION

Emissions of nitrogen oxide, principally nitrogen dioxide ($NO_2$) and nitric oxide (NO), collectively referred to as NOx, have been linked to urban smog, acid rain and numerous harmful health effects. Of all NOx emissions produced in the United States, an estimated 55 percent is attributed to stationary sources such as utility boilers, industrial boilers, gas turbines and stationary engines.

The U.S. Environmental Protection Agency has promulgated New Source Performance Standards (NSPS) to define limits on allowable NOx emissions permitted from such stationary sources in order to abate the harmful effects caused by such emissions. However, NOx emission levels exceeding NSPS occur in many combustion facilities rendering the point source susceptible to fine and/or interruption of business.

In order to enhance the air quality surrounding such point sources and to promote cleaner burning combustion processes, three major approaches have been undertaken to reduce NOx emissions: (1) making modifications before combustion; (2) making modifications during combustion; and (3) adding controls after combustion. Typical precombustion modifications include switching fuel stocks, emulsifying the fuel with water, and denitrifying the fuel. Typical combustion modifications include changing reaction stoichiometry, reducing combustion temperature and reducing process residence time. Flue-gas or exhaust gas treatment generally contemplates adding controls downstream of combustion.

NOx reduction during combustion has been employed since the early 1970's and has achieved a limited degree of success in reducing NOx emissions. However, flue-gas treatment is typically required to obtain higher levels of NOx reduction and to meet increasingly stringent environmental regulations. Flue-gas treatment consists of dry processes and wet processes. Dry flue-gas treatment processes are typically preferred over wet processes because they typically require less equipment and produce less waste that requires disposal.

Selective Catalyst Reduction (SCR) of nitrogen oxides using ammonia is currently considered one of the most efficient processes for removing NOx from flue gases. The SCR process is typically carried out on a titania supported vanadia catalyst employing $NH_3/NO$ stoichiometric ratios near 1.0 and temperatures ranging from 300° to 400° C. to achieve conversions of up to 90%. NOx conversion increases with $NH_3/NO$ ratio but higher ratios typically result in ammonia slip (ammonia breakthrough) which causes a secondary environmental problem.

The reaction pathway of SCR processes employing ammonia involves the oxidation of $SO_2$ to $SO_3$ by the vanadia catalyst followed by formation of $NH_4HSO_4$ and $(NH_4)_2S_2O_7$ which can cause corrosion and plugging of reactor components and catalyst deactivation. These problems coupled with equipment and operating costs associated with the storage, delivery and use of ammonia in SCR processes have led to a search for improved processes which do not utilize ammonia. However, such improved processes for removing NOx from oxygen-containing flue gases have eluded researchers.

Researchers have been investigating the use of hydrocarbons in the place of ammonia in SCR processes. Adlhart, et. al., R. E. Chem. Eng. Pro. 76, 73 (1971) studied the catalytic reduction of NOx in nitric acid tail gas using natural gas over alumina-supported platinum, palladium and rhodium catalysts. Results demonstrated that methane was the most difficult fuel to ignite among the fuels studied, requiring preheat temperatures of 480° to 510° C. Moreover, additional fuel in excess of the stoichiometric equivalent of total oxygen was required to completely remove NOx from the tail gas. For example, 1.7% methane was required to remove 0.23% NOx in tail gas having 3.0% oxygen at temperatures higher than 500° C.

Limitations associated with the use of methane in processes for removing NOx from flue gas were confirmed in subsequent studies. Ault and Ayen, R. J., AIChE J. 17, 265 (1977), investigated the catalytic reduction of NOx in a substantially oxygen-free combustion stream. NOx-containing flue gas was reacted in the presence of hydrocarbons including methane, ethane, ethylene, acetylene, propane, propylene, octane, benzene and cyclohexane over a barium-promoted copper chromite catalyst in an oxygen-free atmosphere. Under reaction temperatures ranging from 225° to 525° C., an increase in the number of carbon atoms comprising the hydrocarbon reducing agent generally resulted in a decrease in the temperature required to effect the subject nitric oxide reduction. For example, about 10% NO was converted to the corresponding reduction products using methane as the reducing agent at 500° C. wherein the nitric oxide inlet concentration was 1.0% and an amount of hydrocarbon 10% in excess of the stoichiometric requirement was employed.

Hamada and coworkers, Appl. Catal. 64, L1 (1990), Catal. Lett. 6, 239 (1990) studied the catalytic reduction of NOx in oxygen-containing flue gas using H-form zeolite and alumina catalysts and small amounts of propane and propene as reductants. The most active catalyst of three H-form zeolites studied was H-mordenite which gave the maximum nitric oxide conversion of 65% at 673K followed by H-ZSM-5 and HY. Na-ZSM-5 provided a nitric oxide conversion of 32% at 573K.

The above-mentioned results suggest that NOx reduction efficiency depends not only on process operating temperatures but also on the type of catalyst and hydrocarbon employed as well as the amount of oxygen present in the NOx-containing flue gas. These factors have greatly impaired the ability to predict optimum catalysts and operating conditions in processes for removing NOx in combustion products such as flue gas.

Japanese Patent Application No. 291258/1987 discloses a zeolite catalyst for estroying NOx in automotive exhaust gas. The zeolite is ionically exchanged with a transition metal and carried on a refractory support. Preferred transition metals are copper, cobalt, chromium, nickel, iron and manganese. Copper is the most preferred. Preferred zeolites have a pore size ranging from 5 to 10 angstroms which is slightly larger than the molecular diameter of NOx. Methane was not disclosed as a reducing agent.

Iwamoto and coworkers, Shokubai 32, 6 430 (1990) demonstrated the effectiveness of NO reduction over copper-exchanged zeolite catalysts using $H_2$, $CO_2$, $C_2H_4$, $C_3H_6$ and $C_3H_8$ as reductants. However, no data was presented for NO reduction over the enumerated catalysts using methane as a reductant. The rate of conversion to $N_2$ increased with increasing $O_2$ concentration and maximum conversion was obtained when $O_2$ was between 0.8 and 2.0%. The authors concluded that the presence of oxygen was indispensable to the progress of the reaction but that a large excess of oxygen resulted in a decline in the NO removal rate. Further, during a public meeting, Iwamoto stated that methane was not an effective reducing agent for converting NOx in the presence of oxygen when Cu-ZSM-5 served as a catalyst.

Iwamoto and coworkers, Catalysis Today 10 57 (1991) classified methane a non-selective reductant for NO, which classification means that methane is ineffective for NOx reduction in the presence of excess oxygen. Truex and coworkers, Platinum Metals Review, Vol. 36, 1, (1992) reported that Cu-ZSM-5 was completely ineffective for NO reduction with methane in the presence of oxygen (the conversion was reported at 0% below 500° C.).

U.S. Pat. No. 5,017,538 discloses an improved method for producing an exhaust gas purification catalyst which comprises a ZSM-5 catalyst carried on a refractory support. The ZSM-5 catalyst is ion-exchanged with a copper carboxylate and ammonia solution. Although no details are known about the reaction mechanism, preliminary studies suggest that catalyst activity and reaction selectivity vary with the hydrocarbon utilized with $C_3H_6$ being preferable to $C_3H_8$. The method is improved by a small amount of oxygen.

Operators of natural gas (methane) fired power stations, industrial boilers and combustion processes have been searching for an efficient and inexpensive catalytic reduction process for removing NOx from oxygen-containing flue gases. However, a catalytic process for destroying NOx in oxygen-rich combustion products utilizing methane as a reductant has not been reported.

BRIEF SUMMARY OF THE INVENTION

The present invention relates to a process for simultaneously catalytically removing NOx and carbon monoxide from oxygen-rich combustion products which process utilizes a unique and unobvious combination of catalyst and reducing agent. Under appropriate process conditions, the claimed process provides conversion of NOx and carbon monoxide to the desired products, namely, nitrogen gas, water and carbon dioxide.

The process comprises combusting a fuel source in the presence of oxygen to form combustion products comprising nitrogen oxides, carbon monoxide and oxygen; introducing methane into the combustion products in an amount such that the total amount of methane to nitrogen oxides, expressed as a ratio, by volume is greater than 0.1; and reacting the nitrogen oxides, carbon monoxide, methane and oxygen in the presence of the subject catalysts under conditions sufficient to convert the nitrogen oxides and carbon monoxide to gaseous nitrogen, water and carbon dioxide.

As will be further defined in the specification, carbon monoxide may not always be present in the combustion products. Nevertheless, the process performs well irrespective of whether carbon monoxide is present in the combustion products. Likewise, the amount of methane to be added to the combustion products will depend upon the amount of methane used as a fuel source and the efficiency of the combustion process. If methane is used as a fuel source and a portion of the methane is not combusted thereby remaining in the combustion products, then methane requirements may be diminished by the amount of methane already residing in the combustion product.

The catalysts of the present process comprise crystalline zeolites having a silicon to aluminum ratio of greater than or equal to about 2.5 wherein the zeolite is exchanged with a cation selected from the group consisting of gallium, cobalt, nickel, iron, chromium, rhodium and manganese. In an alternate embodiment the metal-exchanged zeolite catalysts are subjected to further metal-exchange treatments to exchange the catalyst with additional cations. Such additional cations include those metals represented by the third period transition metals and members of Groups 8, 9 and 10 of the Periodic Table of the Elements as defined by the notation presented in Pure & Appl. Chem., 60, 3, pp. 431-436 (1988).

In another alternate embodiment the ion-exchanged zeolites of the present invention are impregnated with various anionic and neutral species. Suitable impregnating moieties include oxidizing metals selected from Group 5, 6, 7 and 11 of the Periodic Table of the Elements as defined above. A preferred metal is niobium. In another alternate embodiment the exchanged zeolites are further impregnated with from 0.1 to 40% alumina based upon the total weight of the exchanged zeolite.

Suitable fuel sources to be combusted in the present process comprise combustible fuels which do not contain methane and combustible fuels which contain methane. Suitable fuels which do not contain methane include petroleum based fuels such as gasoline, diesel fuel and gaseous and liquid hydrocarbons, excluding methane, and mixtures thereof Suitable fuels which contain methane include natural gas, gaseous and liquid hydrocarbons containing methane, refuse and mixtures thereof.

The combusting of the above-mentioned fuels can take place in a wide variety of apparatus including internal combustion engines and external combustion devices. Following combustion of the fuel source, methane is introduced into the combustion products in an amount such that the total amount of methane to nitrogen oxides, expressed as a ratio, by volume is greater than about 0.1. Preferably, the ratio of methane to nitrogen oxides ranges from about 0.1 to about 800, and most preferably, between 0.1 and about 400.

In the case of combustion products formed by combusting a fuel source which does not contain methane, the entire portion of methane to be introduced to catalytically destroy NOx and carbon monoxide may be taken from a conventional external tank or source such as a pipeline. Alternatively, when the combustion products are formed by combusting a fuel source containing methane, the fuel to air ratio of the combustion process can be controlled by conventional steps to regulate the amount of methane, if any, remaining in the combustion products. Consequently, an additional amount of methane is added to the combustion products such that the total amount of methane to nitrogen oxides, calculated as a ratio, by volume is greater than about 0.1.

The process according to this invention is capable of affording high conversion of NOx and carbon monoxide to environmentally safe products and can be conveniently incorporated into a wide variety of powered devices including mobile conveyances such as automobiles, trains, boats and the like and stationary devices such as boilers, turbines and the like. The advantages afforded over conventional SCR processes include high NOx removal efficiency; use of a cost efficient reducing agent, methane; elimination of ammonia as a reducing agent, as taught in conventional SCR processes; the ability to operate the process in oxygen-rich flue gas and operation under mild temperatures and ambient pressure.

BRIEF DESCRIPTION OF THE DRAWING

The FIGURE shows conversion of NO as a function of temperature.

DETAILED DESCRIPTION OF THE INVENTION

The present invention relates to a process for catalytically removing NOx and carbon monoxide from oxygen-rich combustion products. The process utilizes a unique and unobvious combination of catalyst namely, metal-exchanged crystalline zeolites, and a novel reducing agent, methane, to yield a process which is capable of simultaneously removing NOx and carbon monoxide from oxygen-containing combustion products. This process represents a significant advance over prior art de-NOx processes which typically are incapable of destroying carbon monoxide.

The process comprises combusting a fuel source in the presence of oxygen to form combustion products comprising nitrogen oxides, carbon monoxide and oxygen; introducing methane into the combustion products in an amount such that the total amount of methane to nitrogen oxides, expressed as a ratio, by volume is greater than about 0.1; and reacting the nitrogen oxides, carbon monoxide, methane and oxygen in the presence of the subject catalysts under reaction conditions sufficient to convert the nitrogen oxides and carbon monoxide to gaseous nitrogen, water and carbon dioxide.

Throughout this specification and appended claims, the term, NOx, as used herein shall refer to one, or a mixture of two or more nitrogen oxides, including NO, $NO_2$, and the like, formed during typical combustion processes. Applicants have filed a separate patent application relating to removing of $N_2O$ from combustion products and such application is identified as U.S. patent application Ser. No. 07/790,611, now U.S. Pat. No. 5,171,553.

The term, combustion products, shall be given a definition which is broader than the conventional definition known in the art. The term shall include reaction products formed from burning or a chemical change accompanied by the liberation of heat, sound and/or light. Combustion products shall include products formed from burning fuels such as flue gases and engine exhaust as well as products formed from chemical reactions wherein NOx is present. A example of such a chemical reaction includes nitric acid production which is known to produce substantial amounts of NOx.

Applicants' process and the results obtained therefrom are most unexpected in view of the collective teachings of the prior art. Prior to this invention, no long lived, catalytic process employing crystalline zeolite catalysts was known for reducing NOx and carbon monoxide in an oxygen-containing combustion product wherein methane functioned as the reducing hydrocarbon.

For example, prior art processes using supported metal catalysts such as rhodium on alumina in the presence of methane were reported to be highly active for reducing nitric oxide present in substantially oxygen-free flue gas but the catalyst was substantially deactivated in the presence of oxygen. The poor performance of methane as a reducing agent in oxygen-containing combustion products was also demonstrated by Adlhart, et al, R. E. Chem. Eng. Pro. 76, 73 (1971) who studied the catalytic reduction of NOx in nitric acid tail gas using natural gas as a reductant over platinum, palladium and rhodium catalysts.

Adlhart demonstrated that methane was the most difficult fuel to ignite, among a group of fuels studied, requiring preheat temperatures of 480° to 510° C. Moreover, additional fuel in excess of the stoichiometric equivalent of total oxygen was required to completely remove NOx from the tail gas. For example, 1.7% methane was required to remove 0.23% NOx in tail gas having 3.0% oxygen at temperatures higher than 500° C.

A zeolite catalyst for destroying NOx in automotive exhaust gas was disclosed in Japanese Patent Application No. 291258/1987. The zeolite was ionically exchanged with a transition metal and carried on a refractory support. Preferred transition metals were copper, cobalt, chromium, nickel, iron and manganese with copper being most preferred. Methane was not disclosed as a reducing agent.

Based upon the collective teachings of the cited prior which state that methane is a poor reductant for destroying NOx in the presence of oxygen, one of ordinary skill in the art would conclude that the ion-exchanged zeolites disclosed in Japanese Patent Application No. 29128/1987, would be ineffective in reducing NOx in oxygen-containing combustion products when methane is used as the reductant.

Applicants have unexpectedly discovered that methane is an effective reductant for destroying NOx and carbon monoxide in the presence of oxygen when certain catalysts are employed. More particularly, Applicants have discovered that various metal exchanged zeolite catalysts simultaneously destroy NOx and carbon monoxide present in combustion products when methane is used as the reductant and oxygen is present in the combustion product.

The combination of the defined metal-exchanged zeolite catalysts and use of methane as a reductant overcomes problems associated with prior art processes wherein the presence of oxygen deactivates the catalyst. Unexpectedly, the present process is activated by the presence of oxygen and is not substantially adversely affected by the presence of a substantial amount of oxygen.

The advantages afforded by the present invention over conventional SCR processes include high NOx removal efficiency; use of a cost effective and facile reducing agent, methane; elimination of ammonia, used as a reducing agent in conventional SCR processes; and the ability to operate the process using oxygen-rich NOx sources under moderate temperatures and ambient pressure. Additionally, the process can be readily adapted to vehicles powered by internal combustion engines as will be discussed in greater detail.

The process of this invention is suited for destroying NOx and carbon monoxide generated by internal combustion engines and external combustion devices such as utility boilers, industrial boilers and gas turbines which utilize any available fuel source. Suitable fuel sources to be combusted in the present process comprise combustible fuels which do not contain methane and combustible fuels which contain methane. Consequently, methane-containing fuel sources such as natural gas can be advantageously used to form combustion products containing a residual amount of unburned methane which serves as a reductant thereby reducing the overall amount of methane which must be added to the combustion products to destroy NOx.

Alternatively, combustion products produced by fuel sources which do not contain methane can be treated according to the present process in order to destroy NOx and carbon monoxide, if present in the combustion product. Since essentially no methane is present in the combustion products formed by burning a fuel source which does not contain methane, total methane requirements must be supplied by external methane sources such as fuel tanks, pipelines or the like. Suitable fuels which do not contain methane include petroleum based fuels such as coal, gasoline, diesel fuel and gaseous and liquid hydrocarbons, excluding methane, and mixtures thereof. Suitable fuels which contain methane include, but are not limited to, natural gas, refuse, and gaseous and liquid hydrocarbons containing methane and mixtures thereof. Those skilled in the art will recognize that some non-methane-containing fuels may produce some methane under conventional combustion conditions.

The combusting of the above-mentioned fuels can take place in a wide variety of apparatus including internal combustion engines such as diesel and gasoline engines and gas turbines, and external combustion devices such as boilers and process heaters. Gas turbines or combustion turbines are capable of burning both gaseous and liquid hydrocarbon fuels. Following combustion of the desired fuel source, methane is introduced into the combustion products in an amount such that the total amount of methane to nitrogen oxides, expressed as a ratio by volume, is greater than about 0.1, preferably between 0.1 and 800 and most preferably, between 0.1 and 400.

In the case of combustion products formed by combusting a fuel source which does not contain methane, the entire portion of methane to be introduced may be taken from a conventional external tank or source such as a pipeline. Alternatively, when the combustion products are formed by combusting a fuel source containing methane, or able to produce methane, the fuel to air ratio of the combustion process can be controlled by conventional steps to regulate the amount of methane, if any, remaining in the combustion products. Consequently, an additional amount of methane is added to the combustion products to reach the desired level of methane to be used as a reductant in the resulting steps of the process.

The process of the present invention is particularly suited toward being integrated into conveyances powered by internal combustion engines such as automobiles, trains and the like. Following combustion of the desired fuel, methane stored in a conventional storage tank is transferred into the combustion exhaust containing oxygen, NOx and carbon monoxide prior to making contact with the enumerated catalysts. Alternatively, internal combustion engines can be effectively powered by natural gas or other methane-containing fuels wherein the methane provides a dual role as a combustion fuel and a reductant for destroying NOx and carbon monoxide. As stated previously, additional amounts of methane can be added as necessary to control the desired methane to NOx ratio.

The present process is equally effective in removing NOx from gaseous mixtures formed during any chemical reaction, including but not limited to the preparation of nitric acid. In this embodiment the combustion product is a reaction product which contains NOx or alternatively a gaseous stream consisting essentially of NOx. The process of this invention does not have to be modified to remove NOx present in combustion products formed from a chemical reaction.

Applicants' process comprises contacting the combustion products containing NOx and oxides of carbon with a desired amount of methane and oxygen in the presence of metal-exchanged natural or synthetic crystalline zeolites having a silicon to aluminum ratio of greater than or equal to about 2.5 under combustion conditions sufficient to convert NOx to gaseous nitrogen, water and carbon oxides.

The zeolites of the present invention can be used either in the alkali metal form, e.g., the sodium or potassium form; the ammonium form; the hydrogen form or another univalent or multivalent cationic form to the extent that such zeolites are capable of being exchanged with the metals discussed herein. Suitable crystalline zeolites include those materials which are stable under the described reaction conditions and which have a pore size sufficient to effect the subject reaction. While catalysts having a Si/Al ratio less than 2.5 prior to treatment appear to demonstrate only limited activity, such catalysts may be activated by subjecting the catalyst to dealumination according to methods well known in the art.

Zeolite catalysts to be metal-exchanged include MOR, MFI and FER structured zeolites. Representative zeolites under the MOR designation include mordenite, Na-D, Ptilolite and Zeolon. Representative zeolites under the MFI designation include ZSM-5, Silicalite-1, Silicalite, Zeta-1, Zeta-3 and AZ-1. Representative zeolites under the FER designation include ferrierite, SR-D, Fu-9, NU-23 and ZSM-35.

Typically, the pore size of the base zeolite will range from about 5 to 15 angstroms although such a range is not to be construed as limiting the scope of this invention. The sodium form of ZSM-5 can be prepared by the procedures disclosed in U.S. Pat. No. 3,702,886, I & EC 24, 507 (1985) and Shiralkar, et. al., A. Zeolite, 9, 363, (1989), the disclosures which are specifically incorporated by reference herein.

LZ-M-5 zeolite, a synthetic material residing in the non-acid, sodium cation form and an example of a MOR structure type zeolite, is commercially available from Union Carbide Corporation, Chickasaw, Ala. LZM-5 has the following chemical composition (wt % anhydrous)

$SiO_2$ 78.7
$Al_2O_3$ 12.5
$Na_2O$ 7.33
$SiO_2/AT_2O_3$ (molar ratio) 10.7
$Na_2O/Al_2O_3$ (molar ratio) 0.96

The term, mordenite, is meant to include those synthetic and naturally occurring zeolites having the mordenite topology as included under the general IUPAC structural code of mordenite (MOR). While naturally occurring mordenites vary widely in purity, the synthetic zeolites tend to have higher purity and controlled pore structure thereby rendering the synthetic mordenites preferable for catalytic applications.

Mordenite can be synthesized from a wide variety of starting materials of both chemical and natural origins. Synthetic mordenites are typically produced with Si/Al ratios ranging from 5 to about 12.5. Mordenite is a porous crystalline catalyst having a rigid three-dimensional anionic network with intracrystalline channels whose narrowest cross-section has essentially a uniform diameter. Mordenite is distinguished over crystalline alumino-silicate clays such as bentonite which have a two-dimensional layered structure and over aluminosilicates which are amorphous.

The original alkali metal cations of the zeolites according to this invention are preferably replaced in accordance with techniques well known in the art such as ion-exchange, acid-base and solid state reactions. For example, the alkali metal cations of the zeolite can be replaced, at least in part, by ion-exchange with from about 0.1 wt % to about 15 wt % (based upon the total weight of the catalyst) of one or more cations selected from gallium, niobium, cobalt, nickel, iron, chromium, chromium, rhodium and manganese. Alternately, ion exchange can be effected by solid state or vapor phase whereby the $H^+$ form of the zeolite is reacted with a metal halide salt (MX) or a metal oxide to liberate HX or water and to place the subject metal into the exchange site.

In a preferred embodiment, the zeolites of this invention can be exchanged with a precious metal selected from the group consisting of platinum, palladium, ruthenium, rhodium and iridium. A suitable metal-exchange technique comprises contacting the zeolite with a solution which contains the salt of the desired replacing cation or cations. Examples of suitable salts include the halides such as chlorides, nitrates, carboxylates and sulfates. A preferred exchange solution is cobalt(II) acetate.

In an alternate embodiment the metal-exchanged zeolite catalysts can be subjected to further metal-exchange treatments to exchange sites on the catalyst with additional cations. Such additional cations include those metals represented by the third period transition metals and members of Groups 8, 9 and 10 of the Periodic Table of the Elements as defined by the notation presented in Pure & Appl. Chem., 60, 3, pp. 431-436 (1988). Preferred cations include cobalt, nickel, iron, manganese and silver. The amount of second metal to be exchanged ranges from about 0.01 wt % to about 2 wt % based upon the total weight of the catalyst with the remaining portion of the exchanged metal comprising cobalt.

In another alternate embodiment the metal-exchanged zeolites of the present invention are impregnated with various anionic and neutral species. Suitable species may be selected from oxidizing metals or their oxides formed from metals selected from Group 5,6,7 and 11 of the Periodic Table of the Elements as defined by the notation presented in Pure & Appl. Chem., 60, 3, pp. 431-436 (1988). The term, oxidizing metal, refers to a metal which is capable of catalyzing oxidation reactions and which affords enhanced catalytic activity when impregnated onto the metal-exchanged zeolites of the present invention. Preferred species include silver and oxides of niobium, molybdenum, vanadium and manganese. The amount of metal to be impregnated onto the metal-exchanged zeolite catalyst is that amount which is sufficient to achieve the desired selectivity and conversion of NOx and carbon monoxide to the reduction products.

Generally, the amount of metal moiety impregnated onto the metal-exchanged zeolite catalyst ranges from about 0.01 to 15 wt %, and preferably between about 0.1 to 8 wt % based upon the total weight of the impregnated metal-exchanged zeolite catalyst. However, the level of impregnation should not be such that substantially all of the pores on the zeolite catalyst become clogged thereby rendering the catalyst inactive for the subject process.

In another alternate embodiment, the exchanged zeolites are further impregnated with alumina. Applicants have discovered that a small amount of alumina impregnated onto the subject metal-exchanged catalysts provides a substantial Unprovement in catalyst activity. In fact, the minimum amount of alumina required to provided the desired result is difficult to ascertain because minute amounts of alumina provide the desired improvement. The maximum amount of alumina to be impregnated onto the catalyst is that amount which begins to adversely affect catalyst performance. General amounts of alumina to be used range from 0.1 to 40% alumina based upon the total weight of the exchanged zeolite.

The metal-exchanged and impregnated metal-exchanged catalysts of this invention may be subjected to thermal treatment prior to use in the process although such treatment is not required to practice the invention. The thermal treatment may be conducted in the reactor prior to contacting the reactants with the catalyst or as a separate step.

The thermal treatment comprises heating the catalysts of this invention to above ambient temperature, preferably between about 80° and 150° C. while under an inert atmosphere of about 1 to 220 atmospheres for a period ranging from about 0.5 to 12 hours to remove residual moisture. The catalyst may be dried during one or more periods utilizing one or more discrete temperatures or temperature ramping techniques known in the art. The amount of time and temperature regime employed to dry the catalyst is not critical to the invention.

The amount of catalyst to be utilized in the present process varies depending upon the reaction conditions (i.e., temperature, pressure and the like), and the type and distribution of components comprising the NOx. An effective amount of catalyst is used, i.e., that amount which causes a reaction involving the oxygen, methane and NOx to selectively produce the desired reduction products.

The catalysts of the invention can be fabricated onto ceramic or metal supports known in the art including those customarily used in the automotive industry. A preferred support has a honey-comb design whereby surface area is maximized to enhance catalytic activity. The catalysts of this invention can be used as a component in catalytic converters such as conventional three-way catalytic converters. The catalysts of this invention can be used in conjunction with conventional platinum catalysts wherein the platinum catalyst is used to reduce residual methane present in the combustion product following removal of NOx and/or carbon monoxide.

Combustion products containing NOx and carbon monoxide can be catalytically reacted in the presence of the subject catalysts under a broad range of conditions. Typically, such reaction is run at temperatures ranging from about 250° C. to 700° C. and pressures between about 0.5 and 300 atmospheres. More particularly, the process can be advantageously run under fixed bed conditions at temperatures ranging from about 350° C. to 600° C. and a gas hourly space velocity ranging from 1,000 to 100,000 $hr^{-1}$, preferably 7,500 $hr^{-1}$ to 30,000 $hr^{-1}$. Some combustion products are produced or changed to sub-atmospheric pressure in the exhaust or flue gases.

The amount of methane to be added to the NOx-containing combustion product such as flue gas is important in achieving satisfactory NOx reduction. While NOx reduction is obtained by using a stoichiometric equivalent or less of methane with respect to NOx, a stoichiometric excess of methane is preferred to ensure complete removal of NOx and carbon monoxide from the combustion product. Generally, the methane/NOx ratio (by volume) is greater than about 0.1 to 100, although preferably, the methane/NOx ratio is maintained between about 0.1 and 800 and most preferably, between 0.1 and 400.

The amount of oxygen to be added to the NOx-containing combustion product is not critical to this invention. Amounts substantially below stoichiometric amounts have been found sufficient to effect the present process although a stoichiometric excess with respect to NOx is preferred to ensure complete removal of NOx from the effluent stream. For example, the process will operate using a lean-burn internal combustion engine wherein the fuel is typically burned with an excess of air in ratios up to 24 parts of air to one part of fuel.

To address concerns regarding venting methane into the atmosphere, a multi-stage catalyst system can be used wherein a first stage contains the above-mentioned catalysts and a second stage contains a catalyst specifically selected to destroy methane. Such methane-destroying catalysts include platinum and palladium based catalysts such as palladium on ZSM-5. NOx and carbon monoxide are destroyed in the first stage of the catalyst and residue methane is destroyed in the second stage prior to venting the products to the atmosphere.

The following examples are provided to further illustrate various embodiments of this invention and to provide a comparison between the enumerated catalysts of this invention and prior art catalysts for destroying NOx in oxygen-containing flue gases. These examples are provided to illustrate the nature of the process described herein and are not intended to limit the scope of the claimed invention. Unless otherwise stated, parts and percentages in the examples are given by volume.

EXAMPLE 1

Preparation of Metal-Exchanged Mordenite Zeolite

The metal-exchanged mordenite catalysts of the present invention are prepared according to the following general procedure. By way of example, Co-LZ-M-5 was prepared by submersing fifteen grams of LZ-M-5, obtained from Union Carbide Company, Chickasaw, Ala., in a 2 liter Co(II)acetate solution (0.02M) with stirring at 80° C. for 24 hours. The resulting cobalt exchanged catalyst was washed with 2 liters of distilled water for 1 hour and filtered followed by drying at 110° C. overnight.

EXAMPLE 2

Preparation of Metal-Exchanged MFI Structure Type Zeolites

The metal-exchanged MFI structure type catalysts of the present invention were prepared according to the following general procedure. For example, ZSM-5 was prepared according to the general procedure described in I & EC 24, 507 (1985) wherein a gel was prepared containing 30% silica solution, sodium hydroxide and aluminum hydroxide in the molar ratio of 3.9 $Na_2O/36$ $SiO_2/Al_2O_3/720$ water. The resulting gel was stirred at 165° C. in a PARR mini-reactor, filtered and washed with de-ionized water. The composition was verified by X-ray diffraction and elemental analysis. Fifteen grams of the resulting Na-ZSM-5, (Si/Al=14) were submersed in a 3.5 liter Co(II)acetate solution (0.01M) with stirring at room temperature for 18 hours followed at 40° C. and 80° C. for 20 and 24 hours, respectively. The resulting cobalt-exchanged catalyst was washed with 3.5 liters of distilled water for 1 hour and filtered followed by drying at 110° C. for 5 hours. Elemental analysis demonstrated that the catalyst contained 4.0 wt % cobalt with a Co/Al ratio of 0.70 which corresponds to 140% of the theoretical exchange level.

EXAMPLE 3

Preparation of Metal Exchanged Co-ZSM-5 Catalyst

The following general procedure can be used to prepare metal exchanged Co-ZSM-5 catalysts. By way of example, Mn-exchanged Co-ZSM-5 catalyst was prepared by submersing five grams of Co-ZSM-5, prepared by the procedure according to Example 2, in 40 ml of a manganese acetate solution (0.01M) with stirring at room temperature overnight (The exchange temperature for preparing copper- and chromium-exchanged Co-ZSM-5 was room temperature while manganese- and nickel-exchange reactions were conducted at 80° C.). The resulting manganese-cobalt-exchanged ZSM-5 catalyst was washed with 2 liters of distilled water for 1 hour and filtered followed by drying at 110° C. for 5 hours.

EXAMPLE 4

Preparation of Niobium-Impregnated Co-ZSM-5 Catalyst 0.18 g. $Nb(HC_2O_4)_5$ obtained from Kaweoki Berylco Industries, Inc., Boyertown, Pa., was dissolved in a solution of 0.55 g $H_2C_2O_4 2H_2O$ in 10 ml water via ultrasonic vibration. 2 ml of the resulting solution was added dropwise with constant stirring to 3.04 g of Co-exchanged ZSM-5 catalyst prepared according to Example 2. The catalyst was dried overnight followed by re-impregnation under the same conditions. The resulting catalyst was dried overnight at room temperature followed by drying at 110° C. for 24 hours. The niobium loading was determined to be 0.4 wt % based upon total catalyst weight.

EXAMPLE 5

Preparation of Alumina-Impregnated Co-ZSM-5 Catalyst

Alumina-impregnated zeolite catalysts can be conveniently prepared using the following general preparation. A desired zeolite, in this case, Co-ZSM-5, was suspended in a minimum amount of deionized water. A desired amount of $Al(NO_3)_3$ was then dissolved in the zeolite slurry such that the concentration of $Al_2O_3$ in the Co-ZSM-5 after calcination was 14% by weight. The Co-ZSM-5/$Al(NO_3)_3$ slurry was vigorously stiffed with a magnetic stiffer until the excess water in the slurry evaporated. The solid was dried at 110° C. for 3 hours and then calcined in air at 525° C. for 1 hour.

EXAMPLE 6.

Preparation of Metal-Exchanged Ferrierite Catalysts

Ferrierite in the $K^+$ and $Na^+$ form, obtained from TOSOH corporation (Japan) was first converted to the $NH_4^+$ form by exchanging with $NH_4NO_3$. Ferrierite in the $NH_4^+$ form was then exchanged with $Co^{2+}$ to obtain Co-ferrierite. For example, 15 g of ferrierite (in $K^+$, $Na^+$ form) was suspended in 180 ml $NH_4NO_3$ solution ($[NH_4^+]=1M$) with constant vigorous stirring. Each exchange was carried out at room temperature overnight and three exchanges were performed. After the final exchange, the preparation was filtered and washed with 1 liter water, filtered again and dried at 110° C. overnight. The elemental analyses of the sample demonstrated that $Na^+$ and $K^+$ cations were completely exchanged out by $NH_4^+$. 10 g of the $NH_4^+$ ferrierite was taken for $Co^{2+}$ exchange. The $NH_4$-ferrierite was suspended in 500 ml water and 4.0 g $Co(C_2O_2H_3)_2 \cdot 4H_2O$ was dissolved in another 500 ml water. The $Co^{2+}$ solution was slowly added into the zeolite slurry while vigorously stirring with a magnetic stirrer. Each exchange was carried out at 80° C. for 24 hours with two exchanges being performed. The resulting preparation was washed with 1 liter water and dried at 110° C. overnight. Analytical analysis confirmed that 74% cobalt was exchanged. Mn-ferrierite was made by the same procedure except that the $Mn^{2+}$ exchange was carried out three times.

EXAMPLE 7

Preparation of Gallium-ZSM-5 Catalyst $NH_4$-ZSM-5 was prepared by converting Na-ZSM-5 using the method according to Example 6. The Na-ZSM-5 was obtained from Vereinigte Aluminum-Werke A.G. (Germany). 10 g of $NH_4$-ZSM-5 was suspended in 500 ml deionized water with constant stirring. 3 g of $Ga(NO_3)_3 \cdot 9H_2O$ was dissolved in 500 ml of water. The $Ga^{3+}$ containing solution was then slowly added into the zeolite slurry. The exchange was carried out at 80° C. for 24 h. The preparation was then filtered, washed in 1 liter of water and filtered again. Finally, the sample was dried at 110° C. overnight.

EXAMPLE 8

Preparation of Pd-ZSM-5 Catalyst

The subject catalyst was prepared according to the following general procedure. 20 grams of $Pd(NO_3)_2$ solution (1.44 wt % Pd) containing $2.72 \times 10^{-3}$ moles Pd, which is equivalent to the base exchange capacity of 5 g of Na-ZSM-5, was prepared. $Pd^{2+}$ was exchanged in a 500 ml solution $[Pd^{2+}]=0.005M$ with 5 g of Na-ZSM-5 for 24 hours. The resulting Pd-ZSM-5 catalyst was filtered and dried at 100° C. overnight. The catalyst contained 3.7% palladium.

EXAMPLE 9

Selective Catalytic Reduction of NOx with Methane and Oxygen

The following general procedure was utilized for effecting the catalytic reduction of NOx and carbon monoxide with methane and oxygen in the presence of the subject catalysts.

A reactor was constructed having a 4 mm i.d. glass tube with an expanded section (8-13 mm i.d.) as a catalyst bed. A separate inlet for admixing oxygen with the NO was provided at a position to enable thorough mixing just prior to contacting the reactants with the desired catalyst. The weight of catalyst used in these tests varied from a few tenths of a gram to one gram. The GHSV can be varied between 100 and 100,000 to achieve desired conversion levels. The reactor was surrounded by a temperature-controlled furnace. The temperature was monitored by a chromel-alumel thermocouple which was in contact with the catalyst bed.

The activity measurements were made with a microcatalytic reactor in a steady-state flow mode. Product analysis was obtained using an on-line gas chromatograph with a thermal conductivity detector. The separation column was packed with 5A molecular sieve (80/100 mesh) and was 4 feet long having a 1/8" outer diameter. Chromatograph temperature was 25° C. and the flow rate of the carrier gas was 30 cm$^3$/min.

PRESENTATION OF DATA

The catalysts according to Examples 1 through 8 and various prior art catalysts were tested according to the procedure of Example 9 for catalytic reduction of NO in the absence of methane and oxygen, in the presence of methane, in the presence of methane and oxygen and in the presence of propene and oxygen. Reaction conditions were constant using the following feedstream: $[NO]=0.16\%$; $[CH_4]=0.10\%$; $[C_3H_6]=0.055\%$; $[O_2]=2.5\%$ and a GHSV of 30,000 h$^{-1}$.

The results presented in Table 1 demonstrate that while Cu-ZSM-5 (Run 2) provides good conversion of NO in the presence of methane (55% conversion) and propene (52% conversion), conversion decreases to 9% when NO is reacted in the presence of methane and oxygen over the Cu-ZSM-5 catalyst. In contrast, Co-ZSM-5 (Run 4) provides a conversion of 9% in the absence of oxygen but yields a 300% increase in conversion when a stoichiometric excess of oxygen is introduced in combination with methane as the reducing agent.

Runs 1 and 2 demonstrate that the prior art catalysts exhibit very high activity using methane as a reductant in the absence of oxygen. However, activity of the prior art catalysts plummets when oxygen is introduced into the system. These results demonstrate the unexpected nature of Applicants' catalytic process for destroying NOx in oxygen-containing combustion products wherein methane is used as a reductant in the presence of the enumerated metal-exchanged catalysts. Contrary to catalysts disclosed in prior art processes wherein the presence of oxygen decreases catalyst activity, the catalysts of the present invention exhibit a substantial increase in activity when oxygen is admixed with the methane reductant.

about 450° C. Run 12 demonstrates that cobalt metal supported on alumina is inactive for the reduction of NO in the presence of oxygen using methane as a reductant. Moreover, Cu-ZSM-5 (Run 13) provided relatively poor conversion to the desired reduction products compared to the Co-exchanged zeolite catalysts of the present invention when oxygen is present in the reactant stream.

Table 3 demonstrates the effect of the methane/NO

TABLE 1[a]

| | | Activity Comparison of Catalysts at 400° C. (%) | | | |
|---|---|---|---|---|---|
| Run | Catalyst (0.1 g) | NO Decomp. | NO + CH$_4$ | NO + CH$_4$ + O$_2$ | NO + C$_3$H$_6$ + O$_2$ |
| 1 | Rh/Al$_2$O$_3$ | —[f] | 100 | 6 | 11 |
| 2 | Cu-ZSM-5* | 17 | 55 | 9 | 52 |
| 3 | Ce—Cu-ZSM-5* | 11 | 50 | 8 | 46 |
| 4 | Co-ZSM-5[b] | 4[b] | 9[c] | 26 | 48 |
| 5 | Nb/Co-ZSM-5[c] | 8[c] | 10[c] | 16 | 18 |
| 6 | Cu—Co-ZSM-5[d] | 9[c] | 24[c] | 17 | 45 |
| 7 | Ag—Co-ZSM-5[e] | 4 | 7 | 29 | ND |
| 8a | Na-ZSM-5* | —[f] | —[f] | —[f] | |

*Comparative Example N/D = no data
[a]GHSV = 30,000; [NO] = 0.16%; [CH$_4$] = 0.10%; [C$_3$H$_6$] = 550 ppm; [O$_2$] = 2.5% balanced by He.
[b]The activity decreased with time, and the conversion was taken when t = 1 hr.
[c]Impregnation of 0.4% of Nb onto Co-ZSM5 catalyst.
[d]Obtained by exchanging Cu$^{2+}$ ion ont the Co-ZSM5.
[e]Ag/Co = 0.04
[f]no activity Table 2 provides a comparison of conversions achieved by reacting NO in the presence of methane and oxygen over various catalysts at defined temperatures. Table 2 demonstrates that cobalt, nickel, iron, chromium and manganese exchanged ZSM-5 (Runs 8, 10 and 11) and cobalt-exchanged LZ-M-5 (Run 9) exhibit significant activity for the subject reaction over a temperature range of 350° to 500° C.

ratio on NO conversion for the reaction of NO in the presence of methane and an excess of oxygen at a temperature of 400° C. over Co-ZSM-5 prepared according to Example 2. Runs 22 through 25 demonstrate that the Co-ZSM-5 zeolites of the present invention provide a high degree of NO conversion over methane/NO ratios ranging from 0.6 to 2.4. In particular, Run 25 (methane/NO=2.4) provides a 95% conversion of NO to

TABLE 2

COMPARISON OF NO CONVERSIONS OVER VARIOUS CATALYSTS AS A FUNCTION TEMPERATURE

| Run | Catalyst | 350° C. | 400° C. | 450° C. | 500° C. | Total Metal (wt %) | Atomic ratio co-metal/ Cobalt |
|---|---|---|---|---|---|---|---|
| 8 | Co-ZSM-5 | 8 | 21 | 34 | 29 | 4.0 | — |
| 9 | Co-LZ-M-5 | 6 | 17 | 27 | 24 | 5.5 | — |
| 10 | Mn-ZSM-5 | 7 | 17 | 30 | 32 | 3.1 | — |
| 11 | Ni-ZSM-5 | 6 | 16 | 26 | 20 | 4.3 | — |
| 11a | Cr-ZSM-5 | — | — | — | 5 | 0.3 | — |
| 11b | Fe-ZSM-5 | — | 8 | 9 | 12 | 1.0 | — |
| 12 | Co/Al$_2$O$_3$* | | | | inactive | | |
| 13 | Cu-ZSM-5* | 6 | 8 | 8 | N/A | 3.7 | — |
| 14 | Fe-ZSM-5 | N/A | 8 | 9 | 12 | 1.0 | — |
| 15 | Co—L zeolite | 5 | 7 | 9 | 11 | — | — |
| 16 | Co—Beta zeolite | 7 | 9 | 16 | 23 | — | — |
| 17 | Mn—Co-ZSM-5 | 8 | 20 | 33 | 29 | 5.5** | 0.07 |
| 18 | Cu—Co-ZSM-5 | 8 | 16 | 20 | 16 | 5.7** | 0.07 |
| 19 | Ni—Co-ZSM-5 | 9 | 23 | 35 | 29 | 5.6** | 0.06 |
| 20 | Cr—Co-ZSM-5 | 9 | 18 | 27 | 24 | 5.3** | 0.05 |
| 21 | Ag—Co-ZSM-5 | 9 | 24 | 34 | 27 | — | |

*Comparative Example
**wt % as cobalt
Experimental conditions:
GHSV = 30000 h$^{-1}$
[NO] = 0.16%
[CH$_4$] = 0.1%
[O$_2$] = 2.5%
N/A = no data available In Runs 17-21, some of the cobalt which was previously ion-exchanged into the ZSM-5 catalyst was exchanged with manganese, copper, nickel, chromium or silver. The activity of the catalyst appears directly related to the cobalt loading level.

Under the specified reaction stoichiometry, each of the catalysts according to Runs 8 through 11 and 14 through 21, inclusive provided maximum conversion at nitrogen gas. Overall, an increase in the methane/NO ratio provides higher conversion to the desired reduction products.

TABLE 3

EFFECT OF CH$_4$/NO RATIO ON NO
CONVERSION FOR REACTION OF NO, OXYGEN
AND METHANE OVER Co(II)-ZSM-5

| RUN | [NO] (ppm) | [CH$_4$] (ppm) | [CH$_4$]/[NO] | NO to N$_2$ (%) |
|---|---|---|---|---|
| 22 | 1600 | 1000 | 0.6 | 44 |
| 23 | 1300 | 1400 | 1.1 | 61 |
| 24 | 1000 | 1800 | 1.8 | 78 |
| 25 | 820 | 2000 | 2.4 | 95 |

Reaction temperature = 400° C.
GHSV = 7500 h$^{-1}$
[O$_2$] = 2.5%

Table 4 demonstrates the effect of temperature on the conversion of NO over Co-ZSM-5 wherein the methane/NO ratio is 0.6 and 2500 ppm oxygen was present in the feedstream. Runs 26 through 30 illustrate that conversion reaches a maximum at approximately 425° C.

TABLE 4

EFFECT OF REACTION TEMPERATURE ON NO
CONVERSION FOR REACTION OF NO, OXYGEN
AND METHANE OVER Co-ZSM-5

| RUN | Temperature (°C.) | Conversion of NO to N$_2$ (%) |
|---|---|---|
| 26 | 350 | 21 |
| 27 | 375 | 35 |
| 28 | 400 | 44 |
| 29 | 425 | 46 |
| 30 | 450 | 39 |

Reaction conditions:
GHSV = 7500 h$^{-1}$
[NO] = 1600 ppm;
[CH$_4$] = 1000 ppm;
[O$_2$] = 2.5%

Table 5 demonstrates the effect of the ratio of oxygen to methane on NO conversion for the reaction of NO over Co-ZSM-5 at 400° C. and a GHSV of 30,000 hr$^{-1}$. The oxygen/methane ratio was varied from 97/1 to 3/1. The results demonstrate that only a modest decrease in NO conversion is caused by increasing the oxygen/methane ratio from 97/1 (Run 31) to 3/1 (Run 36). These results show that the present process can effectively reduce NO in combustion products having a broad range of oxygen content.

TABLE 5

EFFECT OF O$_2$/CH$_4$ RATIO ON NO CONVERSION
OVER Co-ZSM-5 CATALYST

| RUN | [O$_2$] (%) | [CH$_4$] (%) | O$_2$/CH$_4$ | Conversion of to N$_2$ (%) |
|---|---|---|---|---|
| 31 | 4.0 | .041 | 97 | 18 |
| 32 | 3.4 | 0.066 | 52 | 20 |
| 33 | 2.7 | 0.094 | 29 | 23 |
| 34 | 2.0 | .12 | 16 | 24 |
| 35 | 1.3 | 0.15 | 9 | 26 |
| 36 | 0.6 | 0.18 | 3 | 27 |

Reaction conditions: GHSV = 30000 h$^{-1}$
Reaction Temperature = 400° C.
[NO] = 0.16%

Table 6 demonstrates the effect of oxygen content on reduction of NO at 400° C. over Co-ZSM-5 in the presence of methane as the reductant. The reaction stream contained equal amounts of NO and methane (820 ppm) and the oxygen content was varied. Runs 37 through 41 illustrate that NO conversion is enhanced and maintained essentially constant so long as some oxygen is present in the reaction.

Stated alternately, the presence of oxygen actually enhances the conversion of NO to the desired reduction products whereas the catalysts of the prior art are typically deactivated by the presence of oxygen. For example, Run 38 summarizes the reaction wherein 5000 ppm oxygen was utilized which provides 60% conversion to nitrogen gas. In contrast use of over 5 times the stoichiometric amount of oxygen (Run 41) results in essentially no diminution of conversion. At much higher oxygen levels, some diminution in conversion is observed.

TABLE 6

EFFECT OF OXYGEN CONCENTRATION
ON NO CONVERSION OVER Co-ZSM-5 CATALYST

| RUN | Oxygen Concentration (ppm) | Conversion of NO to N$_2$ (%) |
|---|---|---|
| 37 | 0 | 17 |
| 38 | 5000 | 60 |
| 39 | 10000 | 60 |
| 40 | 20000 | 59 |
| 41 | 47000 | 58 |

Experimental conditions: GHSV = 7500 h$^{-1}$
Temperature = 400° C.
[NO] = [CH$_4$] = 820 ppm Table 7 provides a comparison of the activities achieved by using Co-ZSM-5 and Mn-ZSM-5 as a function of methane concentration at a temperature of 400° C. and a GHSV of 7,500 h$^{-1}$. Runs 42 through 46 demonstrate that when an excess of oxygen is utilized, use of greater than a stoichiometric amount of methane results in increased conversion of NO to nitrogen gas. In particular, Co-ZSM-5 (Run 46) provides a 97% conversion of NO to nitrogen gas when the methane/NO ratio is 2.5.

TABLE 7

COMPARISON OF Co-ZSM-5 and Mn-ZSM-5 ACTIVITY
AS A FUNCTION OF METHANE CONCENTRATION

| Run | CH$_4$ (ppm) | CH$_4$/NO | Conversion Over Co-ZSM-5 | Conversion Over Mn-ZSM-5 |
|---|---|---|---|---|
| 42 | 250 | .30 | 26 | 22 |
| 43 | 620 | .76 | 47 | 39 |
| 44 | 1030 | 1.25 | 67 | 52 |
| 45 | 1440 | 1.75 | 80 | 64 |
| 46 | 2050 | 2.5 | 97 | 77 |

Experimental conditions: GHSV = 7500 h$^{-1}$
Temperature = 400° C.
[NO] = 820 ppm
[O$_2$] = 2.5%

The effect of metal loading on catalyst activity is presented in Table 8. The results demonstrate that catalyst activity is directly related to cobalt loading to a level of about 100% (Co/Al=0.5) for conversion of NO in the presence of methane and oxygen under the specified reaction conditions. Run 52 demonstrates that over-exchanging the zeolite with cobalt (Co/Al=1.05) does not cause a substantial decrease in catalyst activity.

TABLE 8

EFFECT OF METAL LOADING ON ZSM-5
CATALYST ACTIVITY

| Run | Co/Al | Reaction Temperature | | | |
| | | 350° C. | 400° C. | 450° C. | 500° C. |
|---|---|---|---|---|---|
| 47 | .22 | 6 | 12 | 20 | 24 |
| 48 | .23 | 7 | 13 | 22 | 27 |
| 49 | .33 | 8 | 18 | 29 | 33 |
| 50 | .68 | 9 | 23 | 34 | 30 |
| 51 | .70 | 8 | 21 | 34 | 29 |

TABLE 8-continued

EFFECT OF METAL LOADING ON ZSM-5 CATALYST ACTIVITY

| Run | Co/Al | Reaction Temperature | | | |
|---|---|---|---|---|---|
| | | 350° C. | 400° C. | 450° C. | 500° C. |
| 52 | 1.03 | 9 | 23 | 34 | 30 |

Experimental conditions:
GHSV = 30000 h$^{-1}$
[NO] = 0.16%
[CH$_4$] = 0.1%
[O$_2$] = 2.5%

Table 9 discloses the results for conversion of NOx in the presence of methane and oxygen over rhodium exchanged ZSM-5 catalyst prepared according to the procedure in Example 2. More particularly, 5 grams of Na-ZSM-5 zeolite was exchanged in a 1-liter Rh(NO$_3$)$_2$ solution ([Rh$^{2+}$]=0.006M twice at 25° C. and 70° C., respectively. The resulting preparation was dried at 110° C. overnight. The elemental analysis showed a rhodium loading of 0.6% by weight. Run 55 demonstrates that 55% conversion to nitrogen gas was obtained when the reaction was conducted at 450° C.

TABLE 9

CONVERSION OF NOx OVER RHODIUM EXCHANGED ZSM-5 AS A FUNCTION OF TEMPERATURES

| RUN | TEMP (°C.) | CONVERSION TO N$_2$ (%) |
|---|---|---|
| 53 | 350 | 9 |
| 54 | 400 | 23 |
| 55 | 450 | 55 |
| 56 | 500 | 34* |

GHSV = 30,000 h$^{-1}$
[NO] = 0.16%
[CH$_4$] = 0.1%,
[O$_2$] = 25%
*Not stable demonstrating a decrease over time Table 10 discloses the results for conversion of NOx and methane in the presence of alumina impregnated Co-ZSM-5 prepared according to Example 7. Runs 57 through 60 demonstrate that NOx conversions were substantially lower on the alumina-occluded samples at low temperatures (400° and 450° C.) but surprisingly, NOx conversion was much greater at high temperatures (500° and 550° C.). Unlike Co-ZSM-5, the bend over of conversion with temperature was not observed on the occluded samples at temperatures up to 500° C. These samples are the most active catalysts at high temperatures, i.e., greater than 500° C. among Co-ZSM-5 catalysts. The high NO conversion on the occluded sample at high temperatures is apparently due to the availability of methane (relatively low conversion of methane) while on a normal Co-ZSM-5, the depletion of methane at 500° C. resulted in the activity bend-over. Alumina occlusion provides a way to modify properties of the subject zeolite catalysts and this method can be extended to other catalyst types, e.g., ferrierite-based catalysts and the like. Run 61 demonstrates that a physical mixture of Co-ZSM-5 powder and Al$_2$O$_3$ does not provide enhanced NOx conversion.

TABLE 10

EFFECT OF ALUMINUM MODIFICATION ON CATALYST ACTIVITY$^a$

| Run | Catalyst | 350° C. | | 400° C. | | 450° C. | | 500° C. | | 550° C. | |
|---|---|---|---|---|---|---|---|---|---|---|---|
| | | NO$^b$ | CH$_4$$^c$ | NO | CH$_4$ | NO | CH$_4$ | NO | CH$_4$ | NO | CH$_4$ |
| 57 | Co-ZSM-5 parent catalyst | 7 | 4 | 19 | 20 | 33 | 56 | 30 | 92 | 18 | 100 |
| 58 | Al/Co-ZSM-5 (1% Al$_2$O$_3$) | 6 | 2 | 16 | 13 | 29 | 35 | 36 | 70 | 25 | 96 |
| 59 | Al/Co-ZSM-5 (3% Al$_2$O$_3$) | 6 | 1 | 16 | 10 | 31 | 32 | 38 | 71 | 26 | 97 |
| 60 | Al/Co-ZSM-5 (6% Al$_2$O$_3$) | 6 | 1 | 16 | 9 | 31 | 33 | 37 | 72 | 25 | 98 |
| 61 | Al$_2$O$_3$/Co-ZSM-5 physical mixture$^c$ | 7 | 5 | 21 | 24 | 32 | 64 | 27 | 93 | 17 | 100 |

$^a$All reaction were run at GHSV = 30000 h$^{-1}$, [NO] = 1600 ppm, [CH$_4$] = 1000 ppm, [O$_2$] = 2.5%.
$^b$conversion of NO in percentage
$^c$conversion of CH$_4$ in percentage
$^d$This sample was prepared by physically mixing Al$_2$O$_3$ powder (12 wt %) with Co-ZSM-5 powder. This mixture was thoroughly grounded in a mortar, pelletized, and then heat treated in an identical way as other samples.

The Figure shows NO conversions on ferrierite based catalyst compared to Co-ZSM-5 as a function of temperature. Elemental compositions of the subject catalysts are summarized in Table 11. The reactions were run under identical conditions: [NO]=1600 ppm, [O2]=2.5 % with 0.1 g sample and a total flow rate of 100 cc/min.] Ferrierite based catalysts significantly enhanced NO reduction activity at temperatures greater than 450° C. For example, the NO conversion at 500° C. achieved by Co-ferrierite is doubled compared to Co-ZSM-5. Ferrierite, with a Si/Al ratio of 6 has higher conversions than that with 8. On Mn-ferrierite, the conversion bend-over was not observed even up to 590° C., a striking contrast to Co-ZSM-5. The superior performance of ferrierite catalysts over Co-ZSM-5 is mainly due to its ability to limit the methane combustion rate at high temperatures. The NH$_4$+ pre-exchange is necessary to obtain stoichiometric Co$^{2+}$ or Mn$^{2+}$ exchange.

TABLE 11

ELEMENTAL COMPOSITION OF FERRIERTIE AND ZSM-5 CATALYSTS

| Catlayst | Si/Al | Co/Al or Mn/Al | Metal Loading Wt % |
|---|---|---|---|
| Co-ZSM-5 | 10.9 | 0.53 | 4.1 |
| Co-ferriertie (8) | 8.3 | 0.37 | 3.2 |
| Co-ferriertie (6) | 5.9 | 0.38 | 4.6 |
| Mn-ferriertie (8) | 8.4 | 0.27 | 2.3 |

Table 12 discloses catalyst activities achieved for conversion of NOx using Co-ZSM-5 and Ga-ZSM-5. Although the NO conversions obtained using both catalysts were comparable at temperatures less than about 450° C., the NO conversion obtained using Ga-ZSM-5 at temperatures greater than about 500° C. are much higher than those obtained using Co-ZSM-5. More importantly, Ga-ZSM-5 is much more selective toward NOx reduction; the catalyst uses much less methane to achieve similar or even greater NO conversions. The highest methane conversion on Ga-ZSM-5 is only 32% while 100% conversion was obtained on Co-ZSM-5. The efficiency of the Ga-ZSM-5 catalyst is further demonstrated in Table 13 wherein the NO conversion is shown as a function of methane level. Even with only 195 ppm methane (methane/NO=0.25) the Ga-ZSM-5 catalyst demonstrates remarkable reduction activity.

TABLE 12

COMPARISON OF CATALYTIC ACTIVITIES[a] BETWEEN Ga-ZSM-5 and Co-ZSM-5

| Run | Catalyst | 350° C. | | 400° C. | | 450° C. | | 500° C. | | 550° C. | |
|---|---|---|---|---|---|---|---|---|---|---|---|
| | | NO[b] | CH$_4$[c] | NO | CH$_4$ | NO | CH$_4$ | NO | CH$_4$ | NO | CH$_4$ |
| 62 | Co-ZSM-5 | 7 | 4 | 19 | 20 | 33 | 56 | 30 | 92 | 18 | 100 |
| 63 | Ga-ZSM-5 | 6 | 3 | 17 | 12 | 30 | 23 | 34 | 29 | 33 | 32 |

[a]The reactions were run at GHSV = 30000 h$^{-1}$ with [NO] = 1610 ppm, [CH$_4$] = 1000 ppm, [O$_2$] = 2.5%.
[b]conversion of NO in percentage
[c]conversion of CH$_4$ in percentage

TABLE 13

NO CONVERSION (%) ON Ga-ZSM-5 AS A FUNCTION OF CH$_4$ LEVEL[a]

| Run | (CH$_4$) (ppm) | NO Conversion |
|---|---|---|
| 64 | 195 | 28 |
| 65 | 390 | 35 |
| 66 | 780 | 39 |
| 67 | 1170 | 41 |

[a]This reactions was run at 500° C. with a GHSV = 30000 h$^{-1}$, [NO] = 805 ppm and [O$_2$] = 2.5%.

Table 14 present results for a dual-bed catalyst system comprising a NO reduction catalyst as the first layer and a methane oxidation catalyst as a second layer. The results demonstrate that the multilayer catalyst system can effectively reduce NO to N$_2$ and completely oxidize the unreacted methane to carbon dioxide. Therefore, reaction conditions (i.e., space velocity and temperature) can be controlled to achieve a desirable NO conversion and avoid methane slip. The second layer is a palladium based catalyst prepared by exchanging palladium onto an inorganic oxide support such as Al$_2$O$_3$, SiO$_2$, Al$_2$O$_3$—SiO$_2$, TiO$_2$ and MgO or onto conventional zeolites.

TABLE 14

COMPARISON OF RESULTS USING A SINGLE BED[a] AND DUAL BED[b] CATALYSTS

| Run | Temp. (°C.) | Single Bed Conversion | | Dual Bed Conversion | |
|---|---|---|---|---|---|
| | | NO (%) | CH$_4$ (%) | NO (%) | CH$_4$ (%) |
| 68 | 350 | 10 | 6 | 10 | 100 |
| 69 | 400 | 23 | 26 | 23 | 100 |
| 70 | 450 | 34 | 64 | 34 | 100 |

[a]Reaction run on a 0.1 g Co-ZSM-5 catalyst with a flow rate of 100 cc/min. and with [NO] = 1600 ppm, [CH$_4$] = 1000 ppm and [O$_2$] = 2.5%.
[b]Reaction run on a dual bed sample, 0.1 g Co-ZSM-5 catalyst (first layer) and 0.1 g Pd-ZSM-5 (second layer) with a flow rate of 100 cc/min. and with [NO] = 1600 ppm, [CO] = 1000 ppm and [O$_2$] = 2.5%.

Further experiments demonstrate that Pd-ZSM-5, alone is not a good catalyst for NO reduction but is an excellent methane oxidation catalyst. Like Pd-ZSM-5, the bimetallic cation exchanged ZSM-5 has a very low NO reduction activity but a very high methane oxidation activity. The order of the catalyst layers for the dual bed is very important, namely the combustion product should first contact the Co-ZSM-5 layer followed by the Pd-ZSM-5 layer. The reverse combination (Pd-ZSM-5 as the first layer and Co-ZSM-5 as the second layer) would be similar to using Pd-ZSM-5 alone, because Pd-ZSM-5 would deplete methane before it reached the Co-ZSM-5 catalyst thereby substantially diminishing the effectiveness of NO reduction.

An additional set of experiments was run to determine whether the subject catalysts generate carbon monoxide during the reduction of NO by methane and whether the subject catalysts can oxidize CO to carbon dioxide if carbon monoxide is deliberately added to the feed stream. As shown in Tables 15 and 16, carbon monoxide (CO) was not detected as a product during the NO reduction at 400° C., and carbon dioxide was formed in an amount equivalent to methane consumption (the carbon balance was greater than 96%). When 1025 ppm of CO was added to the feed, NO conversion increased slightly from 33% to 36% and the CO added was completely oxidized to carbon dioxide (carbon was 100% balanced). These results clearly demonstrate that Co-ZSM-5 is bifunctional, meaning that the catalyst can simultaneously reduce NO via methane as a reductant and oxidize CO to carbon dioxide.

TABLE 15

NO REDUCTION OVER Co-ZSM-5[a] USING METHANE AS REDUCTANT IN THE ABSENCE OF CO

| Species | Inlet Concentration (ppm) | Outlet Concentration (ppm) | Conversion (%) |
|---|---|---|---|
| NO | 820 | — | 33 |
| CH$_4$ | 1015 | 771 | 24 |
| CO | 0 | 0 | N/A |
| CO$_2$ | 0 | 223 | N/A |
| O$_2$ | 25,000 | — | — |

[a]Reaction run at 400° C. at GHSV = 30,000 h$^{-1}$
N/A Not applicable
— not measured

TABLE 16

NO REDUCTION OVER Co-ZSM-5[a] USING METHANE AS REDUCTANT IN THE PRESENCE OF CO

| Species | Inlet Concentration (ppm) | Outlet Concentration (ppm) | Conversion (%) |
|---|---|---|---|
| NO | 820 | — | 36 |
| CH$_4$ | 1015 | 782 | 24 |
| CO | 1025 | 0 | 100 |
| CO$_2$ | 0 | 1270 | N/A |
| O$_2$ | 25,000 | — | — |

[a]Reaction run at 400° C. at GHSV = 30,000 h$^{-1}$
N/A Not applicable
— not measured
1025 ppm CO added The enumerated catalysts of the present invention provide several improvements over prior art processes for removing NOx from combustion processes wherein methane is used as a reductant. First, the claimed catalysts are unexpectedly more active and selective than prior art catalysts in converting NO as well as carbon monoxide in the presence of oxygen and methane; second, the catalysts are not deactivated in the presence of a substantial stoichiometric excess of oxygen; and third, the subject catalysts can be used in conjunction with conventional platinum or palladium catalysts such that the platinum or palladium catalyst removes residual methane not consumed in removing NOX and carbon monoxide.

Having thus described the present invention, what is now deemed appropriate for letters patent is set forth in the following claims.

We claim:

1. A process for destroying nitrogen oxides and carbon monoxide in a combustion product, which process comprises:
   (a) combusting a fuel source in the presence of oxygen to form a combustion product comprising nitrogen oxides, carbon monoxide and oxygen;
   (b) introducing methane into the combustion products in an amount such that the total amount of methane to nitrogen oxides present expressed as a ratio, by volume is greater than 0.1; and
   (c) reacting the combustion products, methane and oxygen in the presence of a catalyst comprising a crystalline zeolite having a silicon to aluminum ratio of greater than or equal to about 2.5 which is exchanged with a cation selected from the group consisting of cobalt, nickel, iron, chromium, rhodium, gallium and manganese, under conditions sufficient to convert a portion of the nitrogen oxides and carbon monoxide to gaseous nitrogen, water and carbon dioxide.

2. The process according to claim 1 wherein the zeolite is exchanged with from 0.1 to about 15 wt % of the cation based upon the total weight of the exchanged zeolite.

3. The process according to claim 2 wherein the zeolite comprises a MOR, MFI or FER structure type zeolite.

4. The process according to claim 1 wherein the combusting of the fuel source is effected in an internal combustion engine.

5. The process according to claim 4 wherein the catalyst further comprises a separate stage comprising a platinum or palladium catalyst on an inert support.

6. The process according to claim 4 wherein the fuel source comprises one or more components selected from the group consisting of gaseous and liquid hydrocarbons having from one to about fifteen carbon atoms.

7. The process according to claim 1 wherein the combusting of the fuel source is effected in an external combustion device.

8. The process according to claim 7 wherein the fuel source comprises one or more components selected from the group consisting of coal, oil, refuse, natural gas and gaseous and liquid hydrocarbons having from one to about fifteen carbon atoms.

9. The process according to claim 1 wherein the reacting of the combustion products in the presence of the catalyst is conducted at temperatures ranging from 250° to 700° C. and pressures ranging from 0.5 to 300 atmospheres.

10. The process according to claim 3 wherein the reacting is conducted in a fixed bed reactor with a gas hourly space velocity ranging from 1,000 hr$^{-1}$ to 100,000 hr$^{-1}$.

11. The process according to claim 2 wherein the exchanged zeolite is further exchanged with from 0.01 to about 2 wt %, based upon total weight of the exchanged zeolite, with an additional metal selected from the third period transition metals or Groups 5, 6, 7 and 11 of the Periodic Table of the Elements.

12. The process according to claim 2 where the metal-exchanged zeolite is impregnated with from 0.01 wt % to 15 wt %, based upon the total weight of the impregnated metal-exchanged zeolite, of an anionic or neutral species containing a metal selected from Group 5,6,7 and 11 of the Periodic Table.

13. The process according to claim 12 wherein the species to be impregnated onto the metal-exchanged zeolite contains a metal selected from the group consisting of niobium, molybdenum, silver, vanadium and manganese.

14. The process according to claim 2 wherein the metal-exchanged zeolite is impregnated with from 0.1 to 23 wt % alumina based upon the total weight of the impregnated metal-exchanged zeolite.

15. The process according to claim 3 wherein the MOR structure type zeolite is selected from the group consisting of mordenite, Na-D, Ptilolite and Zeolon.

16. The process according to claim 3 wherein the MFI structure type zeolite is selected from the group consisting of ZSM-5, Silicalite-1, Silicalite, Zeta-1, Zeta-3 and AZ-1.

17. The process according to claim 3 wherein the FER structure type zeolite is selected from the group consisting of ferrierite, SR-D, Fu-9, NU-23 and ZSM-35.

18. The process according to claim 3 wherein the catalyst is Gallium-exchanged ZSM-5.

19. The process according to claim 3 wherein the catalyst is Co-ZSM-5 onto which alumina has been precipitated.

* * * * *